US009401621B2

(12) United States Patent
Amano et al.

(10) Patent No.: US 9,401,621 B2
(45) Date of Patent: Jul. 26, 2016

(54) WIRELESS CHARGING DOCK WITH AUTO-POSITIONING

(71) Applicant: LENOVO (SINGAPORE) PTE. LTD., Singapore (SG)

(72) Inventors: Masayuki Amano, Kanagawa-ken (JP); Yasumichi Tsukamoto, Kanagawa-ken (JP); Yoshio Nakamura, Kanagawa-ken (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 154 days.

(21) Appl. No.: 14/213,698

(22) Filed: Mar. 14, 2014

(65) Prior Publication Data

US 2015/0263565 A1 Sep. 17, 2015

(51) Int. Cl.
*H02J 7/00* (2006.01)
*H02J 7/02* (2016.01)

(52) U.S. Cl.
CPC .............. *H02J 7/025* (2013.01); *H02J 7/0044* (2013.01); *Y02B 40/90* (2013.01)

(58) Field of Classification Search
CPC ................. H02J 7/0044; H02J 7/025
USPC ........................................ 320/108
See application file for complete search history.

(56) References Cited

U.S. PATENT DOCUMENTS

| 2009/0079387 | A1 | 3/2009 | Jin et al. | |
| 2009/0312049 | A1* | 12/2009 | Isomursu | H04M 1/72569 455/550.1 |
| 2011/0215797 | A1* | 9/2011 | Steinich | G01B 7/003 324/207.25 |
| 2012/0119708 | A1* | 5/2012 | Toya | H01F 38/14 320/137 |
| 2014/0266158 | A1* | 9/2014 | Zwijze | G01B 7/30 324/207.2 |
| 2015/0318898 | A1* | 11/2015 | Jurgovan | H04B 5/0031 455/41.1 |

FOREIGN PATENT DOCUMENTS

CN 203416053 U * 1/2014 ............... H02J 7/00

* cited by examiner

*Primary Examiner* — Vuthe Siek
(74) *Attorney, Agent, or Firm* — Shimokaji IP

(57) ABSTRACT

A wireless charging system may auto-position an electronic device for charging. A docking station may include a transmission source providing wireless charging to the electronic device when the device is moved into charging range by motion elements configured to move the electronic device along one or more docking surfaces of the docking station. In some embodiments, position sensors may detect the presence and location of the electronic device. A control unit may operate the motion elements to move the electronic device toward the charging area.

10 Claims, 8 Drawing Sheets

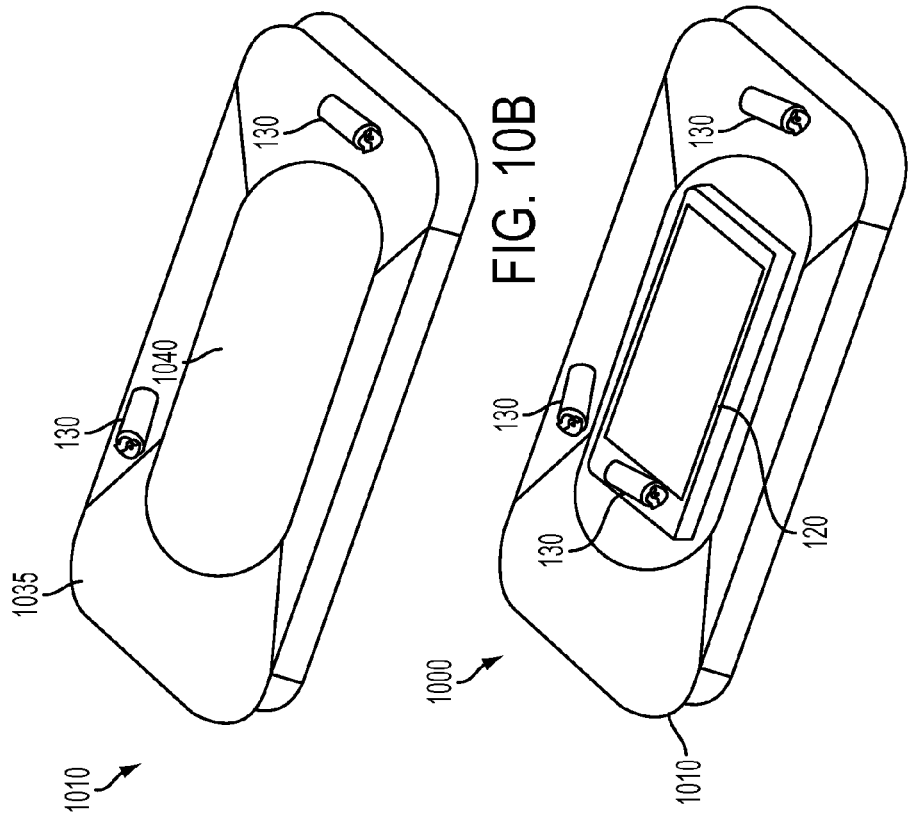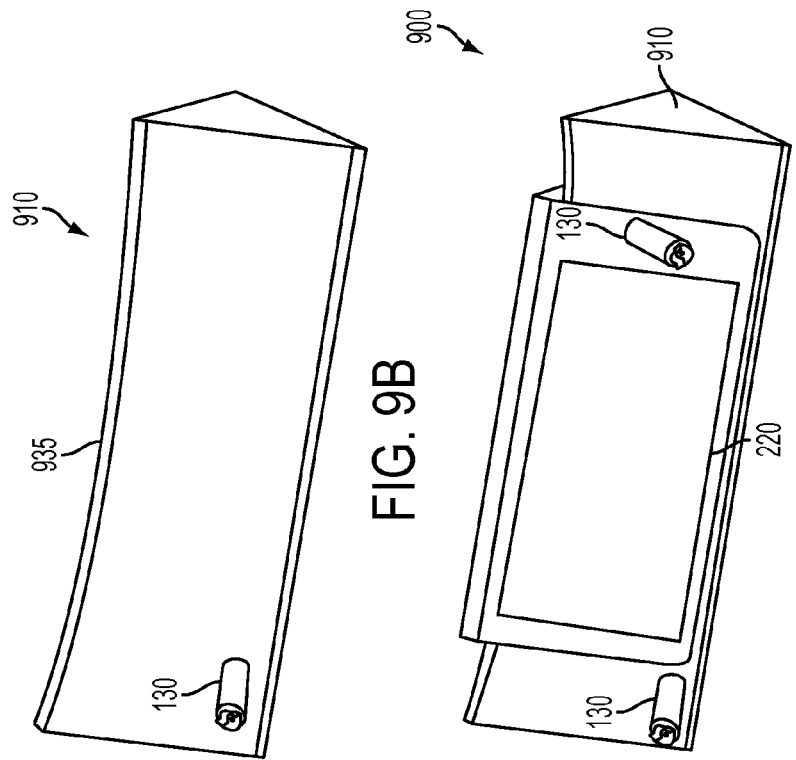

WIRELESS CHARGING DOCK WITH AUTO-POSITIONING

BACKGROUND OF THE INVENTION

The present invention generally relates to electronic accessories and, more particularly, to a wireless charging dock with auto-positioning of an electronic device.

Some portable electronic devices may be re-charged using a docking station. Conventionally, these devices are re-charged via wired connection to an outlet in the docking station. Typically, a charger on the device is plugged into a power source to recharge.

Some docking stations may provide charging wirelessly. The electronic device may be set on the docking station and charge may be transmitted from the docking station to a receiver in the electronic device. For the charging to operate, the receiver typically must be within a predetermined range of the charge transmitter. Improper placement of the electronic device on the docking station may result in the device not being charged. The user may not realize the error in device placement until the device is picked up for use.

As can be seen, there is a need for a charging system that provides auto-positioning of electronic devices on a docking station.

SUMMARY OF THE INVENTION

In one aspect of the present invention, a docking station for charging an electronic device comprises a docking surface configured to receive the electronic device; a power source; a transmission source coupled to the power source; and a control unit configured to control a vibration element that moves the electronic device on the docking surface into a charging position.

In another aspect of the present invention, a docking station for charging an electronic device comprises a sensor disposed to detect the position of the electronic device; a charger; and a motion element responsive to the sensor to move the electronic device within a charging range of the charger.

In another aspect of the present invention, a charging system comprises an electronic device; and a docking station having a power source; a transmission source coupled to the power source and configured to emit a charging signal to the electronic device; and a control unit configured to control a motion of the electronic device on the docking station.

These and other features, aspects and advantages of the present invention will become better understood with reference to the following drawings, description and claims.

BRIEF DESCRIPTION OF THE DRAWINGS

FIG. 9A is a front perspective view of an auto-positioning charging system according to another exemplary embodiment of the present invention;

FIG. 9B is a front perspective view of a docking station of FIG. 9A without an electronic device docked;

FIG. 10A is a front perspective view of an auto-positioning charging system according to another exemplary embodiment of the present invention; and FIG. 10B is a front perspective view of a docking station of FIG. 10A without an electronic device docked.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides auto-positioning of an electronic device on a charging station. A docking station may communicate with the electronic device (or vice versa) to determine if the electronic device is within charging range. For example, if the electronic device is set on the docking station in a position outside of a predetermined charging area, a motion element may move the electronic device into the charging area.

Figure 1:
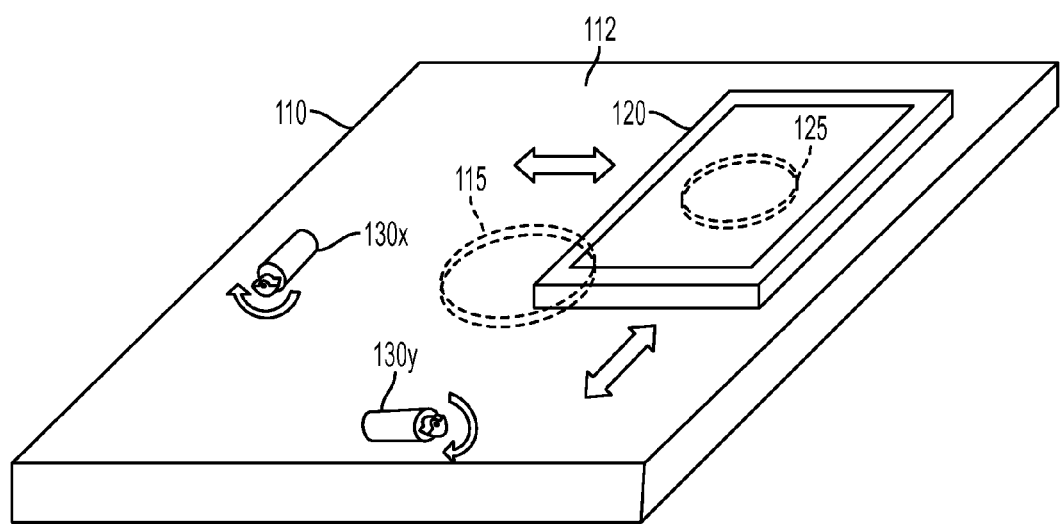
FIG. 1 is a top perspective view of an auto-positioning charging system according to an exemplary embodiment of the present invention.

Referring to FIG. 1, a charging system 100 is shown according to an exemplary embodiment of the present invention. The charging system generally includes a docking station 110 and an electronic device 120. In an exemplary embodiment, the docking station 110 is a wireless charger that may provide charge by, for example, inductance. In an exemplary embodiment, the electronic device 120 is a portable device which may be, for example, a smart mobile phone, an electronic tablet, or portable laptop computer. The electronic device 120 may include a receiver 125 configured to receive a charging signal from a transmission source 115 of the docking station 110. The transmission source 115 and the receiver 125 may be for example, coils configured for inductance charging. Typically, the transmission source 115 and the receiver 125 are internally housed components. However, in FIG. 1, the transmission source 115 and the receiver 125 are shown visible in broken lines for sake of illustration.

In the exemplary embodiment shown, the docking station 110 may be a flat, quadrangular device with a flat, two-dimensional docking surface 112. The electronic device 120 may be set on an area of the docking surface 112. In an exemplary embodiment, the electronic device 120 may be moved until the receiver 125 is within a charging range of the transmission source 115. For example, the electronic device 120 may be moved laterally (either horizontally or vertically)

on the docking surface 112 until the electronic device 120 is substantially over the transmission source 115.

In an exemplary embodiment, the docking station 110 may include one or more motion elements (referred to generally by number 130). The motion elements may be vibration elements 130$x$ and 130$y$, which may be, for example, eccentric weighted vibration motors or piezoelectric motors. The vibration elements (130$x$; 130$y$) may provide a travelling wave across the docking surface 112 which may cause the electronic device 120 to bounce on the docking surface 112 in a direction towards the location of the transmission source 115. In embodiments where the vibration elements (130$x$; 130$y$) are eccentric weighted vibration motors, the vibration elements (130$x$; 130$y$) may be configured to rotate clockwise and counterclockwise to move the electronic device 120 in the X-Y planes of the docking surface 112.

Figure 2:
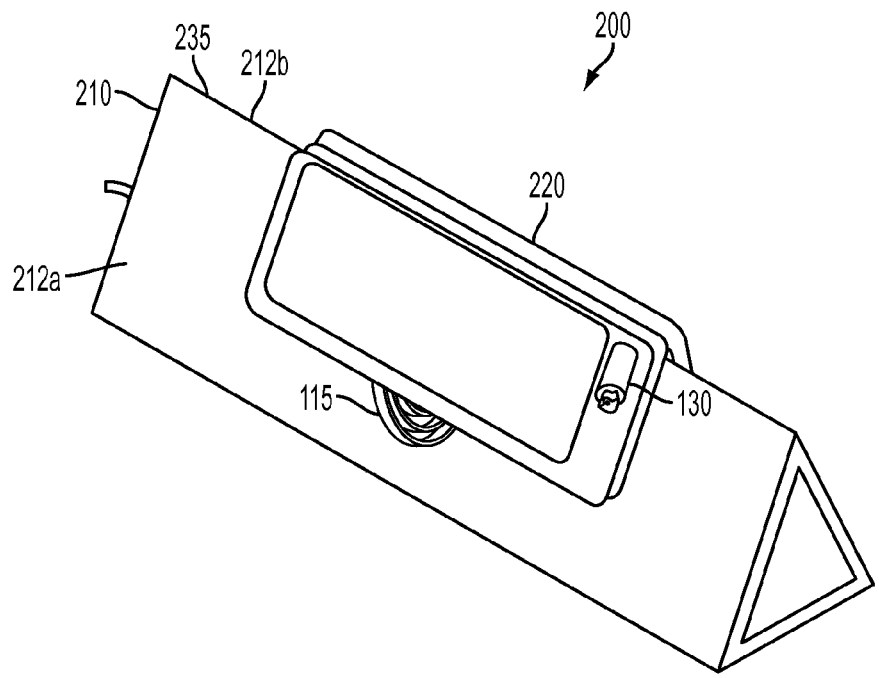
FIG. 2 is a front perspective view of an auto-positioning charging system according to another exemplary embodiment of the present invention.

Referring now to FIG. 2, a charging system 200 is shown according to an exemplary embodiment of the present invention. The charging system 200 is similar to the charging system 100 except that the docking station 210 and the electronic device 220 may be configured to charge a hinged device, for example, when the electronic device 220 is a multi-display device. In addition, the charging system 200 is different than the charging system 100 in that the system 200 may use a motion element 130 in the electronic device 220 to move the electronic device 220 into charging position. The motion element 130 in the electronic device 220 may be a vibration element, for example, an eccentric weighted vibration motor as described with reference to FIG. 1. The docking station 210 may have a generally extended triangular or pyramidal shape. For example, the docking station 210 may include a docking surface 212$a$ and a docking surface 212$b$ (not visible from this view) that may be arranged to form a ridge 235. The charging system 200 may be configured to move the electronic device 220 laterally along the ridge 235 by controlling output from the motion element 130. As shown, the electronic device 220 is in an exemplary charging position over the transmission source 115. The transmission source 115 is shown visible for sake of illustration; however, it will be understood that embodiments will generally house the transmission source 115 inside of the docking station 210.

Figure 3:
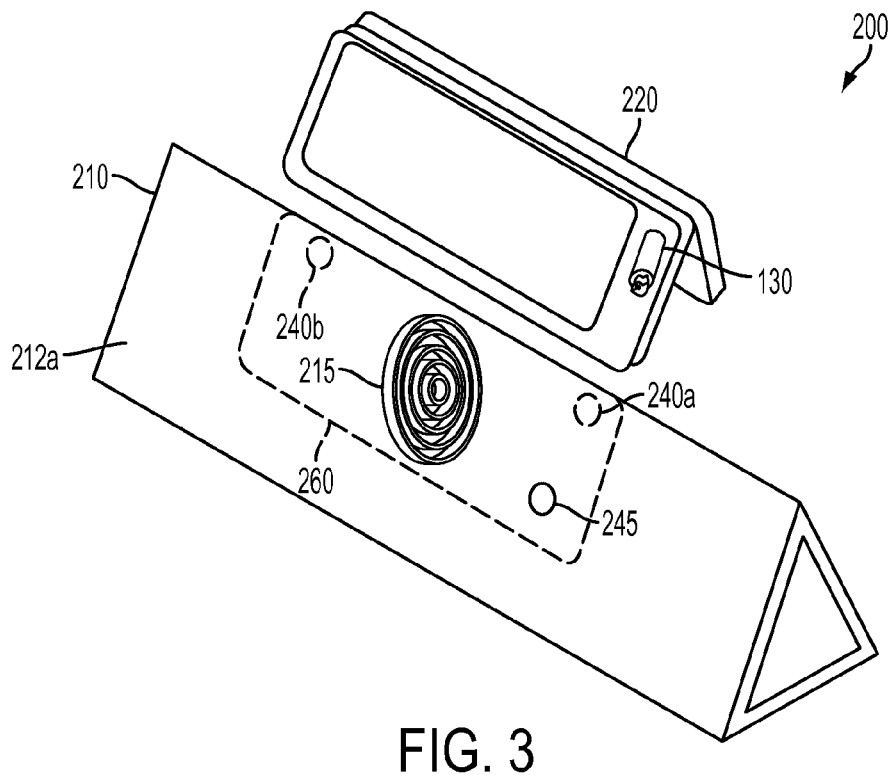
FIG. 3 is an exploded front perspective view of the auto-positioning charging system of FIG. 2.

Referring now to FIG. 3, the charging system 200 is shown with the electronic device 220 exploded from the docking station 210 to reveal a charging area 260. The charging area 260 may define an optimal charging range between the transmission source 115 and the electronic device 220. While only the docking surface 212$a$ side is shown, it will be understood that the docking surface 212$b$ side may be configured in the same manner as docking surface side 212$a$. The charging area 260 may be defined to encompass an arbitrary area around the transmission source 115 that is within a range that provides an optimal charging signal to the electronic device 220. For example, the charging area 260 may have roughly the same length and width as the electronic device 220. While the following is described in terms of an exemplary optimal charging range via the charging area 260, it will be understood that the system 200 may be modified to provide charging at less than optimal charging range. The motion element 130 may be controlled to move the electronic device 220 into the charging area 260 via feedback from position sensors 240$a$ and 240$b$ (referred to generally as position sensors 240) configured to detect the presence and the position of the electronic device 220 on the docking surface 212$a$. In an exemplary embodiment, the position sensors 240$a$ and 240$b$ may be located within the charging area 260. The position sensors 240$a$ and 240$b$ may be for example optical, pressure, or magnet sensor types. In some embodiments, the electronic device 220 may include a magnet sensor 250 configured to detect a magnet 245 on the docking station. The detection of the magnet 245 may indicate that the electronic device 220 is within the charging area 260 and may trigger charging.

Figure 4:
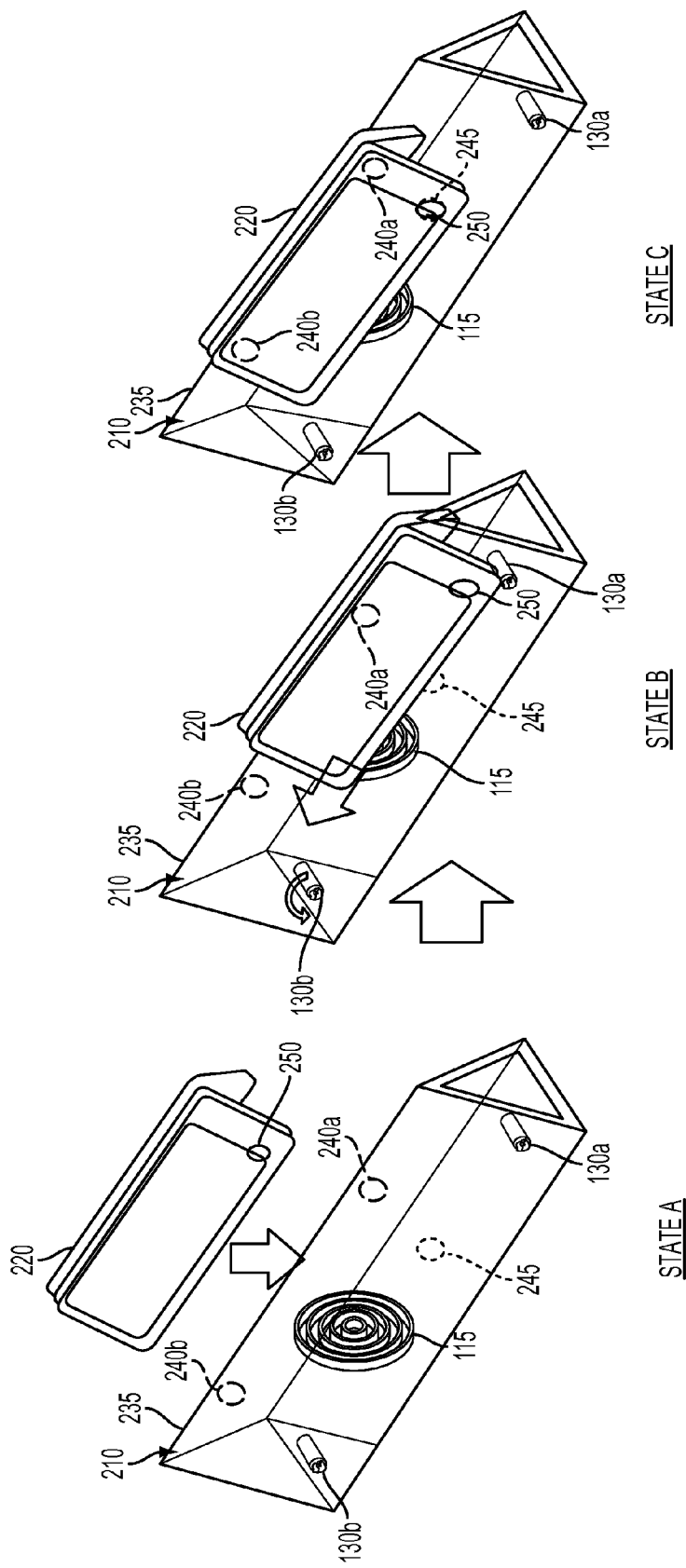
FIG. 4 shows a sequence of auto-positioning of an electronic device docked onto a wireless docking station according to another exemplary embodiment of the present invention.

Referring now to FIG. 4, a series of position states during an auto-positioning of the electronic device 220 on the docking station 210 is shown. Like elements and reference numerals from FIGS. 2 and 3 are shown. In the exemplary embodiment shown, the docking station 210 may include motion elements 130$a$ and 130$b$ configured to move the electronic device 220 along the ridge 235.

In State A, the electronic device 220 is shown being lowered (for example, by a user (not shown)) onto the docking station 210. In State A, none of the position sensors 240 are triggered and thus no indication is provided to operate the motion elements 130. In addition, the magnet sensor 250, by default may be set to an "Off" state which may indicate that the electronic device 220 may not be ready for charging.

State B shows the placement of the electronic device 220 as a result of the placement from the lowering in State A. In State B, the electronic device 220 is positioned near the right end of the docking station 210 and may be out of the charging area 260 (FIG. 3) and thus out of the optimal charging range of the transmission source 115. In response to one of the position sensors 240 being triggered, the electronic device 220 may be moved until both position sensors 240 are triggered. For example, the electronic device 220 is positioned over the position sensor 240$a$ triggering detection of the electronic device 220. However, the electronic device 220 is not in range of the position sensor 240$b$, which is not triggered. Also, charging may occur when the magnet sensor 250 detects the presence of the magnet 245. In State B, the magnet sensor 250 is out of range of the magnet 245 thus indicating that charging is not ready to occur. In an exemplary embodiment, triggering position sensor 240$a$ while position sensor 240$b$ is not triggered may trigger operation of the motion element 130$b$. For example, the motion element 130$b$ may vibrate causing a travelling wave to move across the docking station 210. The travelling wave may cause the electronic device 220 to move left along the ridge 235 until the position sensor 240$b$ is triggered as shown in State C.

In State C, the position sensor 240$a$ and position sensor 240$b$ may be triggered simultaneously, thus indicating that the motion element(s) 130 may cease operation. The magnet 245 may be in range of the magnet sensor 250 thus indicating that the electronic device 220 may be in position to receive a charging signal from the transmission source 115.

While the foregoing movement of the electronic device 220 was described via operation of the motion element 130$b$, it will be understood that the motion element 130$a$ may be operated when the electronic device is initially located toward the left end of the docking station 210 when the position sensor 240$b$ is triggered but the position sensor 240$a$ is not triggered, moving the electronic device 220 to the right. In addition, fine position adjustment of the electronic device 220 may be performed by using both motion elements 130$a$ and 130$b$. For example, in the course of moving the electronic device 220 to the left, the motion element 130$a$ may provide too much impetus causing the electronic device 220 to overshoot. In the event of overshoot, the motion element 130$b$ may provide a counter impetus driving the electronic device 220 back into the optimal charging range, for example, where the magnet sensor 250 detects the magnet 245.

Figure 5:
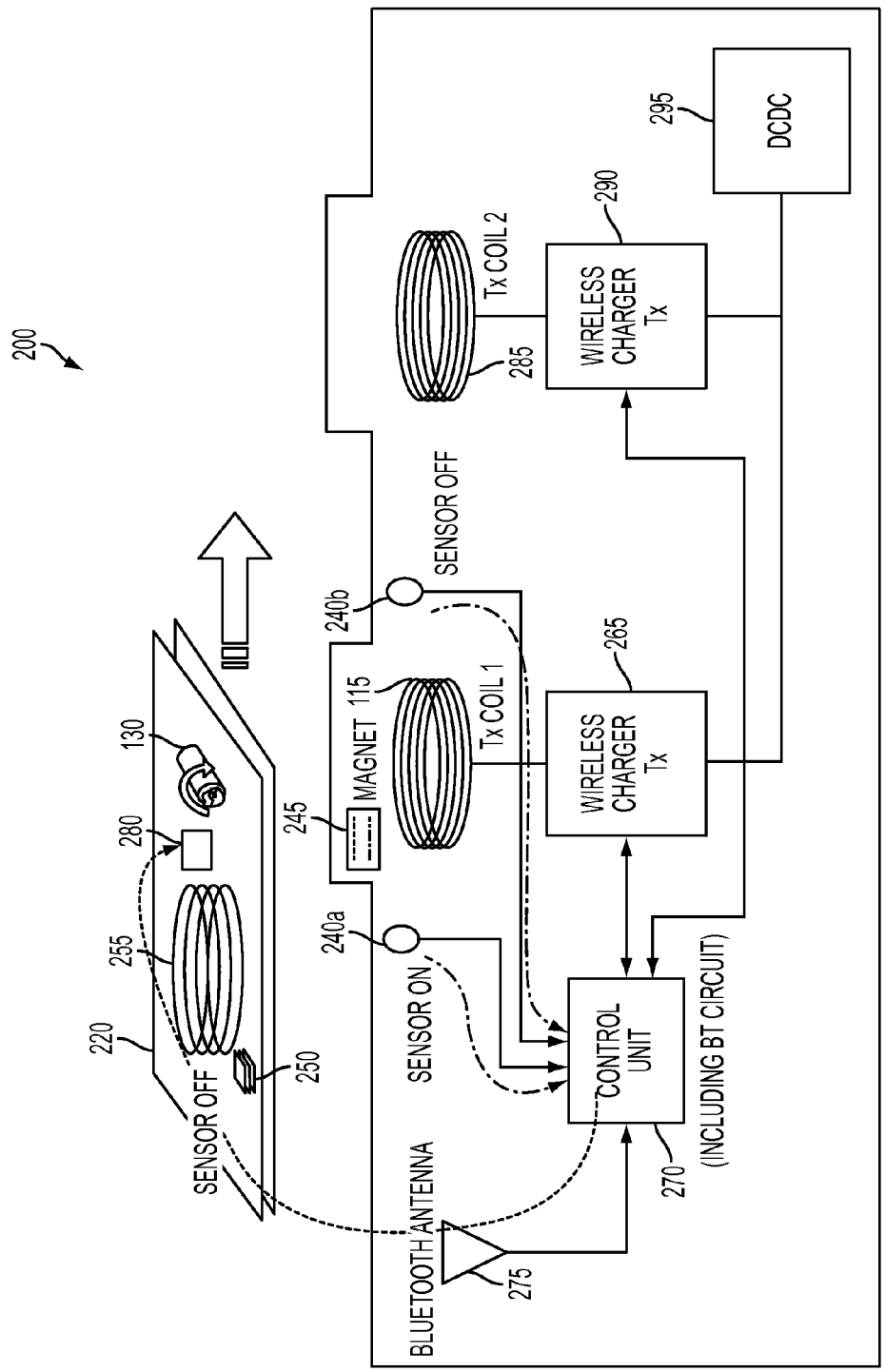
FIG. 5 is a block diagram of the auto-positioning charging system of FIG. 2 representing the electronic device out of position according to an exemplary embodiment of the present invention.

Referring now to FIG. 5, the charging system 200 is shown according to an exemplary embodiment of the present invention. In FIG. 5, internal components of the docking station 210 and the electronic device 220 that are not shown in the previous figures are shown in block diagram form. FIG. 5 is shown representing the electronic device 220 being out of position for charging, for example as shown in FIG. 4, State B. The position sensor 240a is triggered while the position sensor 240b is not triggered. In addition, the magnet 245 is out of range of the magnet sensor 250, thus no charging from the transmission source 115 may occur at this time. A receiver 255 in the electronic device 220 may be configured to receive the charging signal from the transmission source 115 when the electronic device 220 is in charging range. Power from the transmission source 115 may be controlled by a wireless charger module 265 receiving power from a power source 295. A control unit 270, for example, a processor, in the docking station 210 may be configured to receive the states of the position sensors 240a and 240b and determine that the electronic device 220 may be moved. The control unit 270 may transmit a signal via an antenna 275, for example, a Bluetooth® antenna, to a processor 280 in the electronic device 220. The processor 280, in response to the signal from the control unit 270, may operate the motion element 130. The motion element 130 may cause the electronic device 220 to move, for example, by vibration that causes the electronic device 220 to bounce off the ridge 235 (FIG. 3) toward the magnet 245. The foregoing is described with respect to the receiver 255 being in proximity of, for example, the docking surface 212a (FIG. 3). However, it will be understood that the docking surface 212b (FIG. 3) may include a transmission source 285 controlled by a wireless charger module 290 that may be operated by the control unit 270 to provide a charging signal. The transmission source 285 may provide charging for example, when the receiver 255 is in proximity to the docking surface 212b.

Figure 6:
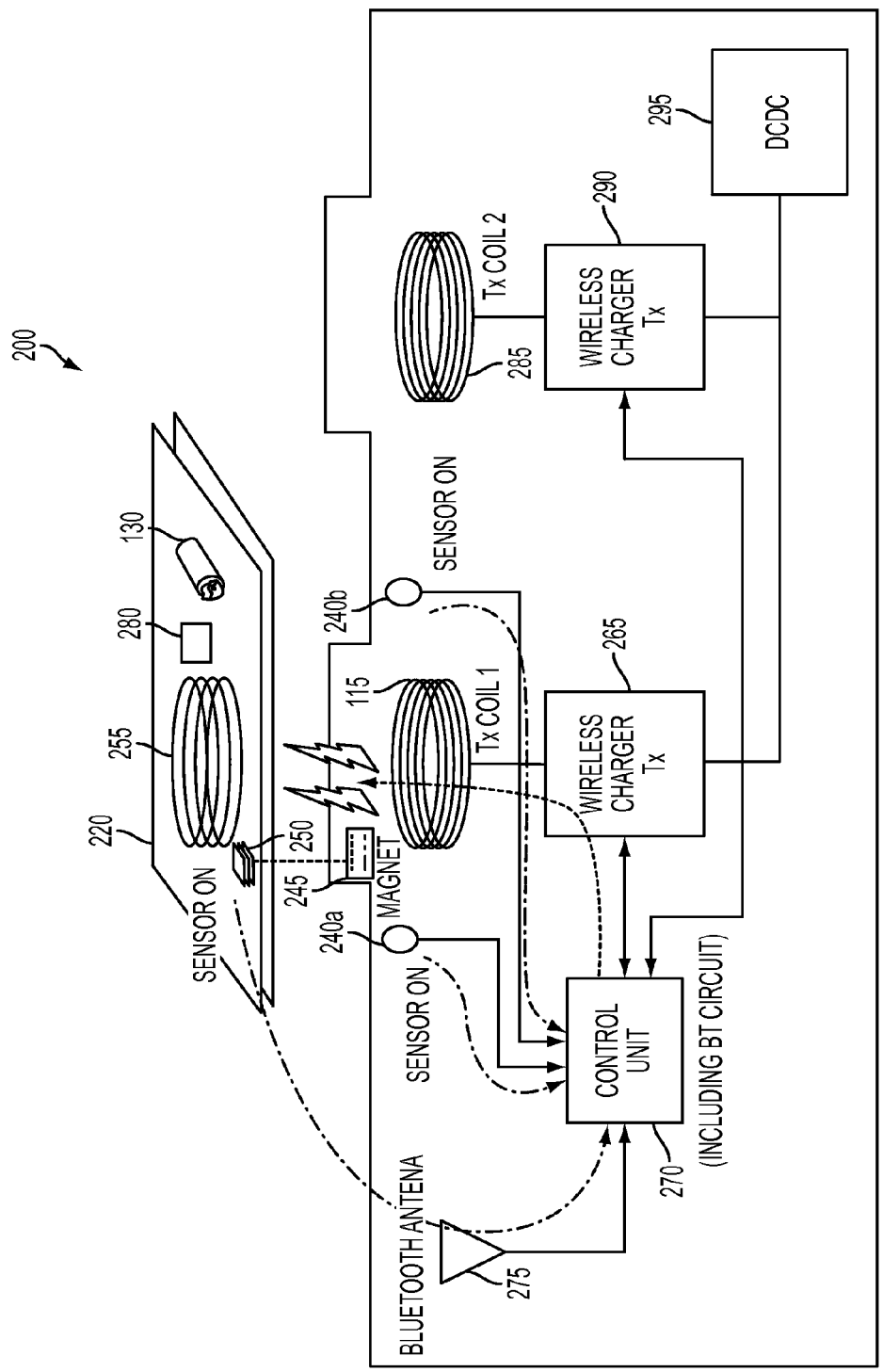
FIG. 6 is the block diagram of FIG. 5 representing the electronic device in charging position.

FIG. 6 shows the electronic device 220 in position for charging. The electronic device 220 may be moved by the motion element 130 until the position sensor 240a and the position sensor 240b are both triggered. The control unit 270 may receive an indication from the magnet sensor 250 that the magnet 245 is detected. In response, the control unit 270 may control the wireless charger module 265 to provide power to the transmission source 115.

Figure 7:
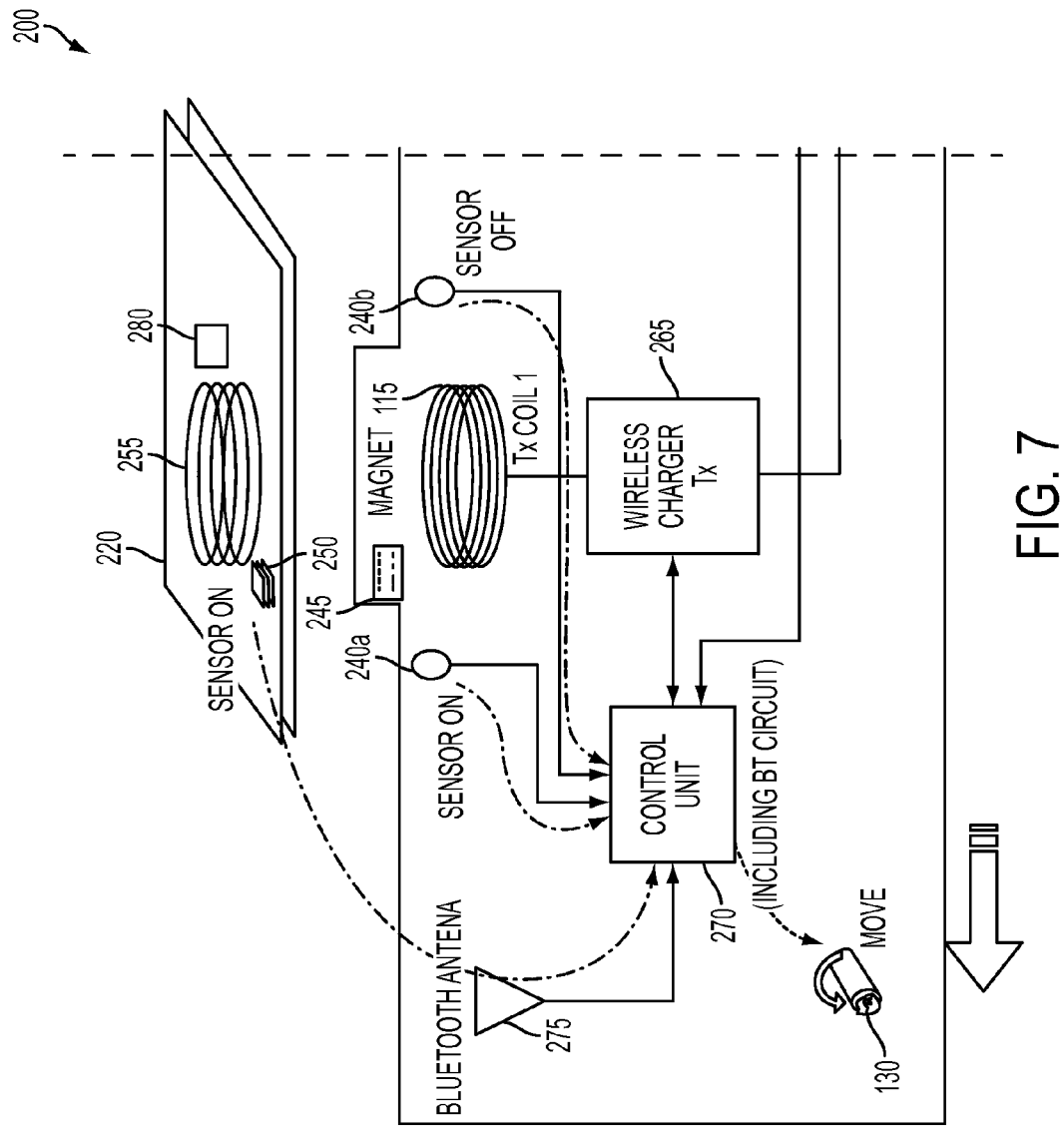
FIG. 7 is a block diagram of the auto-positioning charging system of FIG. 4 representing the electronic device out of position according to an exemplary embodiment of the present invention.
Figure 8:
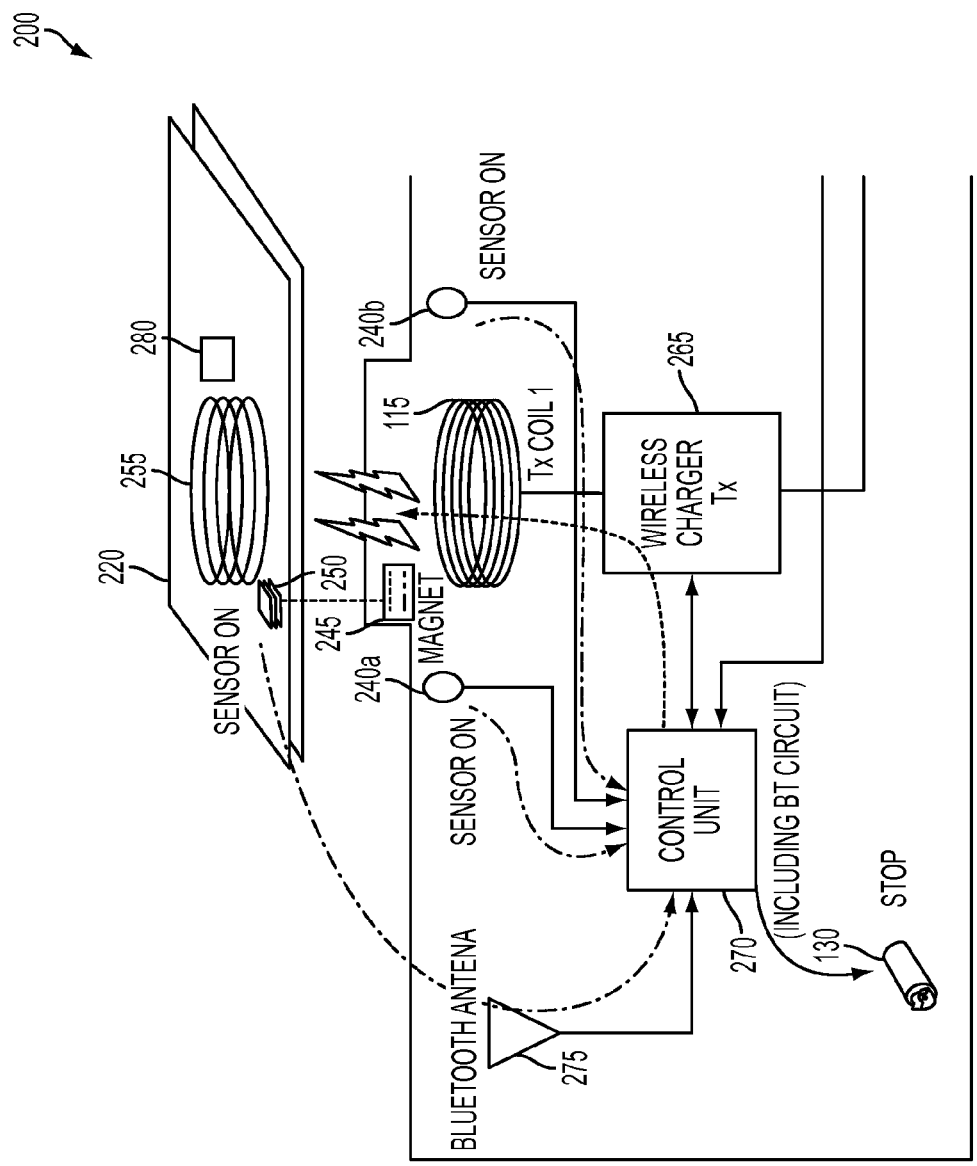
FIG. 8 is the block diagram of FIG. 7 representing the electronic device in charging position.

Referring now to FIGS. 7 and 8, the charging system 200 is shown according to an exemplary embodiment of the present invention. The charging system 200 in FIGS. 7 and 8 is similar to the embodiment shown in FIGS. 5 and 6 except that the motion element 130 may be in the docking station 210, similar to the embodiment shown in FIG. 4. FIG. 7 shows the electronic device 220 out of position. FIG. 8 shows the electronic device 220 in charging position. Upon detection of the electronic device 220 by one of the position sensors 240, for example, the position sensor 240a, the control unit 270 may operate the motion element 130 in the docking station 210 to move the electronic device 220 toward charging range. Movement of the electronic device 220 may occur as described in FIG. 4, State B until the electronic device 220 is in position and the motion element 130 may stop operation (FIG. 8).

Referring now to FIGS. 9A and 9B, a charging system 900 is shown according to an exemplary embodiment of the present invention. The charging system 900 is similar to the charging system 200 except that the docking station 910 may include a concave shaped ridge 935 whose middle is lower than the ends. As the motion elements 130 cause vibrations, movement of the electronic device 220 may be biased toward the center of the docking station 910 by following the slope of the concave shape of the ridge 235. As may be appreciated, fine position adjustment of the electronic device 220 may not be necessary since the concave shape of the ridge 935 may encourage movement of the electronic device down the ridge 235 but gravity may resist movement of the electronic device 220 up the opposing side of the ridge 235.

Referring now to FIGS. 10A and 10B, a charging system 1000 is shown according to an exemplary embodiment of the present invention. The charging system 1000 is similar to the charging system 100 except that the docking station 1010 may include a sloped rim 1035 biasing movement of the electronic device 120 toward a center charging area 1040. As described with respect to FIGS. 9A and 9B, gravity may encourage the electronic device 120 to move down the sloped rim 1035 but gravity may resist movement up the opposite side of the rim 1035, thus biasing the electronic device 120 into the charging area 1040.

It should be understood, of course, that the foregoing relates to exemplary embodiments of the invention and that modifications may be made without departing from the spirit and scope of the invention as set forth in the following claims.

What is claimed is:

1. A docking station for charging up an electronic device, comprising:
 a position sensor configured to detect a position of the electronic device;
 a charger configured to wirelessly charge the electronic device when the electronic device is positioned within a charging range of the charger;
 a motion element responsive to the sensor, the motion element configured to move the electronic device towards the charging range of the charger, upon an activating indication, the activating indication triggered in response to a determination that movement of the electronic device is needed based on the detected position of the electronic device;
 wherein the position sensor includes a first sensor and a second sensor;
 wherein the motion element is configured to move the electronic device in response to a trigger signal received from the first sensor or the second sensor; and
 wherein the motion element is configured to stop moving the electronic device in response to a trigger signal received simultaneously from the first sensor and the second sensor.

2. The docking station of claim 1, further comprising a charging area, wherein the motion element is responsive to move the electronic device into the charging area.

3. The docking station of claim 1, wherein the motion element is in the electronic device.

4. The docking station of claim 3, wherein the motion element is configured to vibrate.

5. The docking station of claim 1, wherein the motion element is coupled to a docking surface of the docking station.

6. The docking station of claim 5, wherein the motion element includes:
 a first vibration motor configured to move the electronic device in a first direction; and
 a second vibration motor configured to move the electronic device in a second direction.

7. The docking station of claim 6, wherein the first direction is opposite the second direction.

8. The docking station of claim 6, wherein the first direction is perpendicular to the second direction.

9. A charging system, comprising:
 an electronic device;
 a motion element; and a docking station, having:
- a transmission source configured to emit a charging signal to the electronic device when the electronic device is within a charging area of the transmission source;
- a position sensor;
- a control unit;
- wherein the position sensor is configured to detect a position of the electronic device and relay to the control unit an indication associated with the detected position,
- wherein the control unit is configured to determine whether movement of the electronic device is needed based on the indication associated with the detected position,
- wherein the control unit is configured to activate the motion element upon determining that movement of the electronic device is needed, the motion element capable of moving the electronic device towards the charging area of the transmission source upon activation; and
- two docking surfaces arranged to provide a ridge between the two docking surfaces, wherein the ridge is configured to hold the electronic device and the control unit is configured to move the electronic device along the ridge.

10. The system of claim 9, wherein the control unit controls a vibration motor of the motion element coupled to the electronic device or to the docking station.

* * * * *